United States Patent [19]

Sato

[11] 4,385,240
[45] May 24, 1983

[54] AUDIO DEVICE FOR MOTOR VEHICLE
[75] Inventor: Masaaki Sato, Hachioji, Japan
[73] Assignee: Olympus Optical Company Limited, Tokyo, Japan
[21] Appl. No.: 247,751
[22] Filed: Mar. 26, 1981
[30] Foreign Application Priority Data
 Mar. 27, 1980 [JP] Japan ................................ 55-39485
[51] Int. Cl.³ ............................................ F02P 11/00
[52] U.S. Cl. .................................................. 307/10 R
[58] Field of Search .......................... 307/10 R, 10 BP
[56] References Cited
U.S. PATENT DOCUMENTS 4,075,504 2/1978 Gnaedinger ................ 307/10 BP X
4,264,855 4/1981 Ghibaudo et al. ........... 307/10 R X
4,305,004 12/1981 Tanaka et al. ..................... 307/10 R Primary Examiner—Donald A. Griffin
Attorney, Agent, or Firm—Toren, McGeady and Stanger

[57] ABSTRACT

An audio device for motor vehicles includes a first battery which supplies power to an automobile, and a second battery arranged to be charged by the first battery when the output voltage of the second battery falls to a certain value. A switching arrangement operates to uncouple the second battery from the first battery, and to connect noise sensitive load circuits to the second battery, exclusively, when a cassette or cartridge is loaded into a cassette loading portion of the device. Accordingly, the noise sensitive load circuits are removed from the influence of electrical noise introduced on the power supply lead of the first battery through operation of the automobile.

2 Claims, 4 Drawing Figures

AUDIO DEVICE FOR MOTOR VEHICLE

BACKGROUND OF THE INVENTION

The present invention relates to an audio device for motor vehicles, to be carried in an automobile.

Recently, audio devices of this type tend to be made with high precision, and particularly, a car stereo device can provided a reproduced sound of good high frequency range. Also, noise inherent to a tape can be reduced by emplying a noise reduction system such as Dolby or the like. That is, such audio device can reproduce a high frequency range up to 1,500 Hz and improves S/N ratio by a large margin.

When the high precision of such device is improved, however, a slight noise picked up from the outside becomes terribly annoying. Particularly, when increasing the engine power of an automobile, the noise induced by operating an ignition plug is mixed with and introduced in a power source line connected to the battery of an automobile, and led to a car stereo. The noise thus is produced together with the reproduced sound, and spoils the reproduced sound which otherwise is of high quality.

It has until now been difficult to completely remove such noise, and as a countermeasure, a filter is used for cutting out a high frequency range, which is against the tendency to high precision in the aforementioned device.

SUMMARY OF THE INVENTION

An object of the present invention is to eliminate the above-described disadvantages of the conventional audio device.

Another object of the present invention is to provide an audio device for automobiles by providing an exclusive battery chargeable by a battery loaded in an automobile and by using the exclusive battery as a power source when using the audio device, so as to positively remove the influence of the noise mixed into the power source line and to obtain a sound of good quality.

According to the present invention there is provided an audio device for motor vehicles, comprising a battery loaded on the side of an automobile, an exclusive battery chargeable by the automobile battery, a load comprised of each part of the audio device, and a switch for cutting the exclusive battery off from the battery loaded on the side of the automobile, and for connecting with load within the audio device to the exclusive battery. Loads in the audio device which are not influenced by noises are connected separately from other loads, and these loads are connected to the battery on the side of the automobile. The exclusive battery comprises a detector for detecting the fact that the output voltage of the battery is lowered to a predetermined value, so as to recharge the exclusive battery by the battery on the side of the automobile. A display device operative in response to the output of the detector is provided. The switch is interlocked with a loading portion for a cassette or cartridge.

DESCRIPTION OF THE PREFERRED EMBODIMENT

Figure 1:
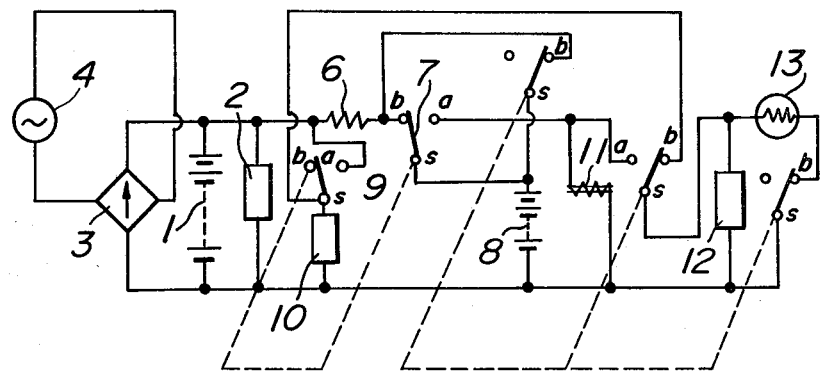
FIG. 1 is a circuit diagram showing one embodiment of an audio device for motor vehicles according to the present invention in a state of non-use.
Figure 2:
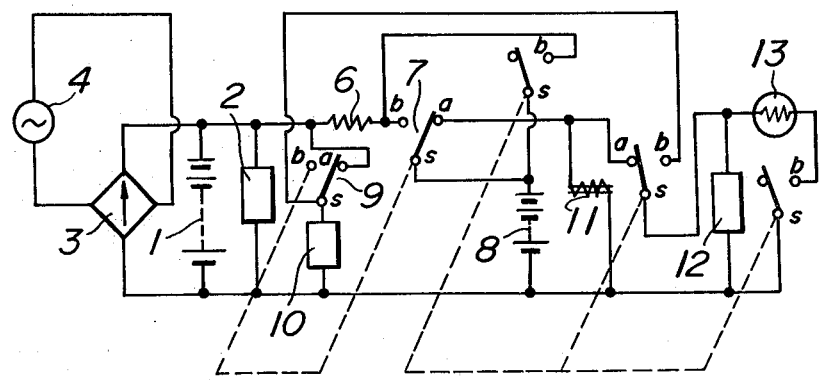
FIG. 2 is a circuit diagram showing the audio device according to the present invention in a state of use.
Figure 3:
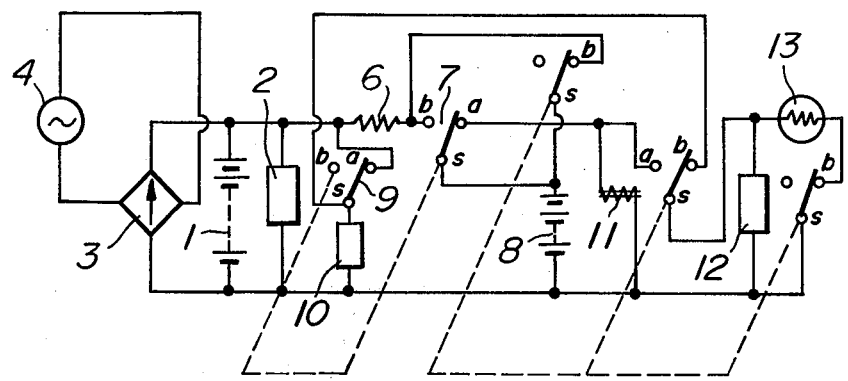
FIG. 3 is a circuit diagram showing the audio device according to the present invention in a state of charging an exclusive battery in use.

Referring now to the drawings, wherein the same reference characters designate the same or corresponding parts throughout the several views, FIGS. 1 to 3 show an embodiment of an audio device for motor vehicles according to the present invention. In this case, the embodiment shows the audio device applied to a cassette type car stereo. In FIGS. 1 to 3, a battery 1 is outside the device, within an automobile (not shown). The battery 1 is connected to each of a number of loads 2 of the automobile and further connected to a generator 4 such as a dynamo through a rectifier 3. The generator 4 here is driven by an engine of the automobile and charges the battery 1.

The battery 1 is connected to a resistor 6 and an exclusive battery 8 through contacts b-s of a switch 7. The exclusive battery 8 is charged by the battery 1. The resistor 6 is used for constant-current charging the battery 8.

Moreover, the battery 1 is connected to a load 10 through contacts a-s of a switch 9. The load 10 includes, for example, a motor portion, a main amplifier portion or the like, which portions do not exhibit any influence from a noise, in an audio device, i.e., a stereo device.

Figure 4:
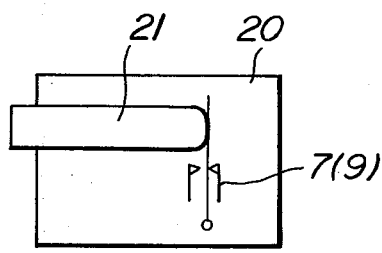
FIG. 4 is a plan view showing a cassette loading portion used in the audio device according to the present invention.

The switches 7 and 9 are interlocked with each other, are provided close to a cassette loading portion 20 of a casing as shown in FIG. 4, for example, and respond to the loading of a cassette 21. FIG. 4 shows such a state. In this case, a cartridge may be used instead of a cassette in the same manner.

Further, the exclusive battery 8 is connected to a detector, for example a relay 11, through contacts s-a of the switch 7. The relay 11 is used for observing the charging state of the exclusive battery 8, so that it is operated by the voltage of the exclusive battery 8 and restored when the voltage of the exclusive battery 8 becomes less than a predetermined value.

The relay 11 is connected to a load 12 through first contacts a-s thereof. The load 12 includes, for example, a stereo reproducing portion or the like, which is susceptible to influence from electrical noise, in the audio device, i.e., the stereo device.

The load 12 is connected to a display device, for example, a lamp 13, through second contacts s-b of the relay 11. A junction point s of the load 12 and the lamp 13 is connected to a junction point s of the switch 9 and the load 10 through first contacts s-b of the relay 11.

Moreover, a junction point s of the switch 7 and the exclusive battery 8 is connected to a junction point s of the switch 9 and the load 10 through third contacts s-b of the relay 11, resistor 6 and contacts s-a of switch 9.

The operation of the audio device constructed as described above will be explained hereinafter.

In the first place, FIG. 1 shows a state when using no car stereo. Under this state, the battery 1 loaded on the side of the automobile is connected to the resistor 6 and the exclusive battery 8 through the contacts b-s of the switch 7, so that the battery 8 is constant-current charged through the resistor 6.

As shown in FIG. 4, when a cassette charging portion 20 is loaded with a cassette 21, the position of the switches 7 and 9 is changed with the interlocked condition as shown in FIG. 2. Under this state, the exclusive battery 8 is cut off from the battery 1 loaded on the side of the automobile, the relay 11 is operated by the exclusive battery 8, and each one of the first to third contacts of the relay 11 is switch as shown in FIG. 2.

A supply voltage of a power source is, then, supplied to the load 12 from the exclusive battery 8 through the contacts s-a of the switch 7 and the first contacts a-s of the relay 11, so that a reproduced sound of good quality can be obtained without any influence of noise mixed into the power source line from the battery 1.

In this case, the load 10 which does not come under the influence of electrical noises receives supply voltage from the battery 1 through the contacts s-a of the switch 9.

Under this state, if discharge of the exclusive battery 8 is continued and the output voltage thereof becomes less than a predetermined value, the relay 11 is returned to the initial state, and each of the first to third contacts of the relay 11 is returned to the initial position as shown in FIG. 3. The battery 1 loaded on the side of the automobile is, therefore, connected to the exclusive battery 8 through the third contacts b-s of the relay 11 thereby to recharge the battery 8. In this case, the load 12 is connected to the battery 1 together with the load 10, so that the noise tends to mix into the load 12, but this state lasts only a minute until the battery is charged to the predetermined voltage, so that there is almost no trouble.

Moreover, the lamp 13 is connected to the battery 1 under this state, so that the lamp can display that the device is not in trouble.

As described above, according to the above construction, the exclusive battery charged by the battery loaded on the side of the automobile can be used as a power supply source when using a car stereo, any influence of the noise mixed into the power source line from the battery loaded on the side of the automobile can positively be removed, and a reproduced sound of good quality can be obtained. Furthermore, the loads which are not influenced by electrical noises are connected separately from other loads in the stereo device and receive supply voltage from the battery provided in the automobile, so that the burden on the exclusive battery is extremely minimized, and a long lifetime of the audio device can be obtained. In addition, when the voltage of the exclusive battery becomes less than a predetermined value, the exclusive battery is charged by the automobile battery and it becomes possible to remove the disadvantage that the car stereo becomes inoperative during use at that time, such charging condition being displayed by a lamp, so that unnecessary anxiety is not aroused in the user. Moreover, since the switching to the exclusive battery can be carried out by only loading a cassette in the car stereo, the operation is very simple.

The present invention is not limited to the above embodiment but can be modified without departing from the scope of the invention. For example, in the above embodiment, the load 10 which does not come under any influence from electrical noise is connected separately from the other loads in the audio device, but the load 10 can be included in the load 12 which is easily influenced by noises. In addition, in the above embodiment, the cassette 21 is loaded in the cassette charging or loading portion 21 so as to change over to the exclusive battery, but a manual operation is also possible. Moreover, in the above embodiment, there are provided the relay 11 for observing the voltage of the exclusive battery and the lamp 13 for displaying the charging of the exclusive battery 8, but the relay and lamp are not particularly necessary. In addition, in the above embodiment, the car stereo device is explained, but the present invention can be applied to any other audio devices for motor vehicles, such as a car radio or like.

As described above, according to the present invention, it is possible to provide an audio device which positively removes the influence of electrical noises mixed into the power source line, and can produce sound of good quality, by providing an exclusive battery charged by the battery loaded on the side of the automobile and using the exclusive battery as a power supply source when using the audio device.

What is claimed is:

1. An audio device for motor vehicles comprising, a first battery including a power supply lead for supplying electrical power to an automobile, a second battery, charging means for recharging the second battery by coupling the first battery to the second battery, a number of sensitive load circuits whose operations are subject to the influence of automotive electrical noise produced on the power supply lead of the first battery, a number of unsensitive loads whose operations are unaffected by automotive electrical noises, switch means for uncoupling the second battery from the first battery and for coupling the sensitive load circuits to the second battery to remove the sensitive load circuits from the influence of electrical noise on the power supply lead of the first battery, said unsensitive loads being arranged to remain coupled to the first battery when the sensitive load circuits are coupled to the second battery by said switch means.

2. An audio device for motor vehicles comprising, a first battery including a power supply lead for supplying electrical power to an automobile, a second battery, charging means for recharging the second battery by coupling the first battery to the second battery, a number of load circuits, switch means for uncoupling the second battery from the first battery and for coupling the load circuits to the second battery, and a cassette loading portion for receiving a cassette including a recording medium, wherein said switch means is interlocked to operate upon loading of a cassette into the cassette loading portion.

* * * * *